March 10, 1970   P. MOULIN ET AL   3,500,025
AUTOMATIC DYNAMIC POSITIONING SYSTEM
Filed Dec. 28, 1966   3 Sheets-Sheet 1

United States Patent Office 3,500,025
Patented Mar. 10, 1970

3,500,025
AUTOMATIC DYNAMIC POSITIONING SYSTEM
Pierre Moulin, Montesson, and Pierre Aubel, Rueil-Malmaison, France, assignors to Institut Francais du Petrole des Carburants et Lubrifiants, Rueil-Malmaison, Hauts-de-Seine, France
Filed Dec. 28, 1966, Ser. No. 605,263
Claims priority, application France, Jan. 6, 1966, 45,095
Int. Cl. B63h 25/42; G06g 7/14
U.S. Cl. 235—150.27                    4 Claims

ABSTRACT OF THE DISCLOSURE

An automatic system for maintaining in a reference position a floating installation having a central annular element freely rotatable with respect to the rest of the installation comprises two propulsion units fixed to the annular element and having thrust axes symmetrical with respect to a diametral plane of said element. A detection device delivers first and second electrical voltages related respectively to the amplitude and to the direction of drift of the installation from its reference position. Means are provided to control by said first voltage the magnitude of the resulting thrust of the propulsion units, and to control by said second voltage the orientation of said resulting thrust.

Figure 1:
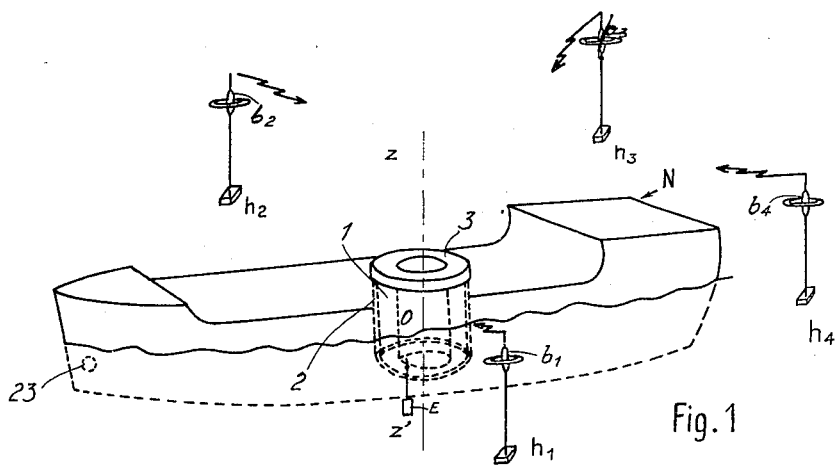

The present invention relates to an automatic dynamic positioning system particularly adapted to floating structures or installations of the type having a central annular element which is freely rotatable around a vertical axis, with respect to the rest of the structure.

Vessels being provided with a structure of this type are already known and described, for example, in British Patent No. 1,014,879.

The vertical axis of the central annular element of such a vessel can be substantially maintained in alignment with a reference vertical passing through a fixed location of the water bottom, by means of a plurality of cables or mooring ropes connecting the central annular element of the vessel to anchors or mooring masses lying on the water bottom.

Under these conditions it is theoretically possible to make the vessel rotate through 360° around its central annular element, so as, for example, to permanently keep this vessel either with the heading which gives the most favorable condition for carrying out offshore operations, such as drilling operations, from the vessel, or with the heading for which the external forces acting on the vessel and caused by winds, currents, swell, etc. result in stresses which are compatible with the resistance of the mooring system of this vessel.

The rotation of a vessel having a structure of this type can be realized without it becoming necessary at any time to lift the anchors or mooring masses and therefore without any drift of the vertical axis of the central annular element from the reference vertical, which in the case of a drilling vessel would make necessary an interruption in the drilling operation.

Such a way of anchoring the central annular element of the vessel has however the drawbacks which are inherent in "static" anchoring through cables or mooring ropes and its application is limited to rather shallow depths.

The main object of this invention is to obviate these drawbacks by replacing the classical mooring means, applied to the central annular element of structures of the above-mentioned type, by an automatic dynamic positioning system capable of automatically maintaining said central element in a fixed location whatever the water depth may be, through the sole action of propulsion units.

Automatic dynamic positioning systems for floating installations have already been described. All these prior systems comprise at least two propulsion units, whose thrust magnitude and/or thrust direction are adjustable and automatically regulated so as to substantially maintain the installation in a given location and with a given heading.

These prior systems also comprise devices for detecting in the form of electric signals any horizontal drift or displacement of the gravity center of the floating installation, a device for measuring the heading of the floating installation and an electronic computer which is adapted to combine all the measurements of these devices so as to determine the magnitudes and/or orientations of the thrusts to be exerted by the propulsion units to counteract the effect of the waves, winds and currents, which tend to draw the floating installation from the selected position and heading. One of the objects of the present invention is to realize an automatic dynamic positioning system for a floating installation of the above-mentioned type, whose operation is independent of the means used for regulating the heading of the installation and which has no interaction with this heading, so as to prevent or at least to limit as much as possible the horizontal drift of the installation from the selected position, this being the main object to be reached, specially during offshore drilling operations performed from the floating installation whose variations in heading have much less perturbing action on the development of such drilling operations.

Another object of the invention is to provide an automatic dynamic positioning system using only ordinary propulsion units, instead of the propulsion units with variable thrust direction of the outboard type, which are costly at the required powers, or of the cycloidal propellers, which are used in the prior dynamic positioning systems.

A further object of the invention is to provide an automatic dynamic positioning system for a floating installation of the above-mentioned type, in which the electronic computer uses only electric signals related to the horizontal displacements of a reference point of the installation, instead of combining such signals with another signal related to the variation in the heading of this installation, such a combination increasing the complexity of the computer and introducing therein moreover a factor of oscillation and resonance for the positioning of the reference point of the installation, since the heading of this installation has generally oscillatory variations about a heading of equilibrium, under the action of all the external forces.

Figure 5:
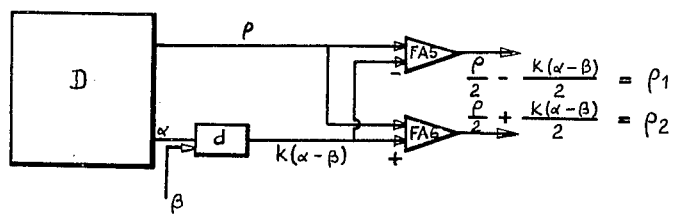
Figure 6:
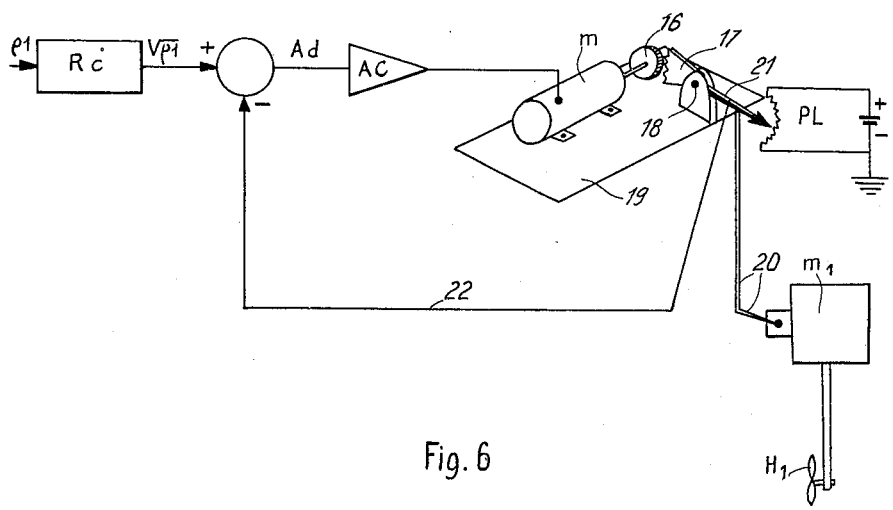
Figure 2:
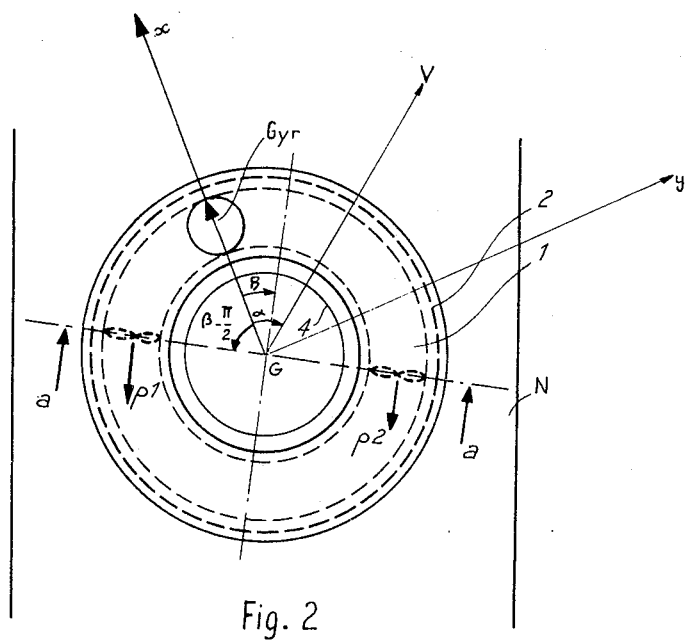
Figure 2A:
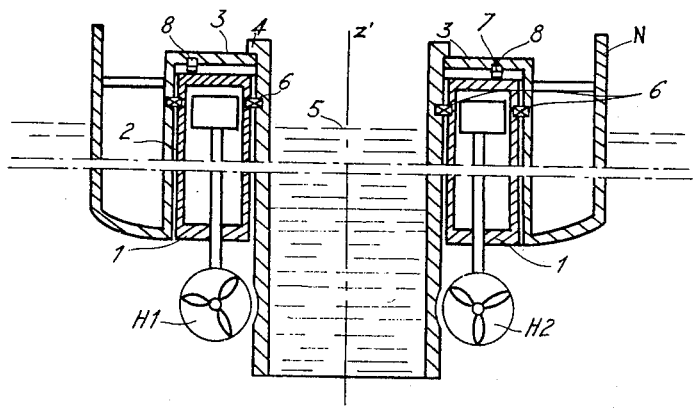
Figure 2B:
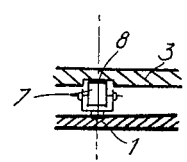
Figure 3:
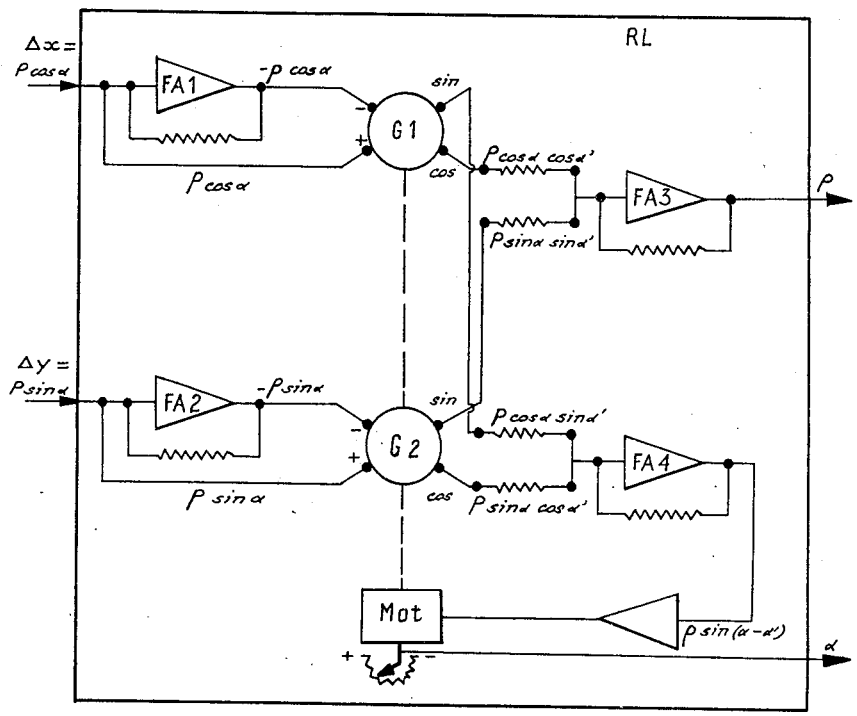
Figure 4:
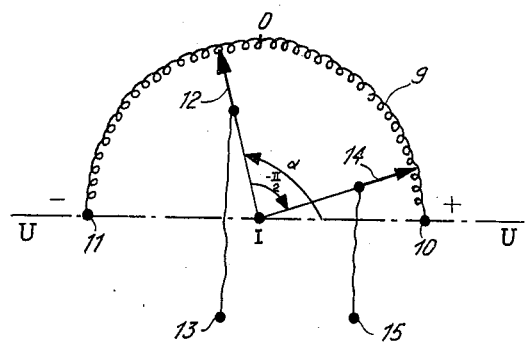

An embodiment of the present invention will now be described by way of example with reference to the accompanying drawings, in which:

FIG. 1 shows a floating installation or vessel having a central annular element which is dissociated from the surrounding structure, FIG. 2 is a schematic view from above of the central part of such an installation equipped with a dynamic positioning system according to the invention, FIG. 2A show a cross sectional view according to line 2—2 of FIG. 2, FIG. 2B illustrates on a larger scale a detail of FIG. 2A, FIG. 3 diagrammatically shows an embodiment of a device for detecting the horizontal displacements of the gravity center of the installation, suitable for use in the system according to the invention, FIG. 4 is a schematic view of a type of potentiometer which may be used in this form of embodiment of the detection device, FIG. 5 shows the electronic circuit of a preferred form of embodiment of this invention, FIG. 6 illustrates a device applicable in a system according to the invention, to control the magnitude of the thrust generated by a propulsion unit.

FIGURE 1 shows schematically a floating installation or vessel N of the type comprising in a vertical well 2 provided through the hull a central annular element 1 which is dissociated from the rest of the installation and can freely rotate, which respect to the surrounding structure, around a vertical axis Z′Z which passes through the gravity center G of the installation.

In the embodiment illustrated by FIG. 1 and FIG. 2A, the annular element 1 is covered by an annular plate 3 which is integral with the part of the installation surrounding the element 1 and with a central sleeve 4 providing for example a passage for a drill pipe.

The annular element 1 floats on the water, whose level in the sleeve 4 is indicated by the reference 5 on FIG. 2A. The weight of this element is preferably adjusted to such a value that, taking into account the height of the water level 5 in the sleeve 4, the buoyancy of water applied to the immersed part of the annular element substantially balances the weight of this element.

In case this weight should be higher than the buoyancy of water, the ball bearings 6 acting as thrust bearings would keep the annular element in position in the well 2.

The main purpose of these ball bearings 6 is to allow the rotation of the annular element 1 around its axis Z′Z and to ensure the centering of this element. They are preferably located above the water level as are the rollers 7 which are secured at the top of the element 1 and roll along an annular groove 8, centered on Z′Z, which is provided under the annular plate 3 (see the detail on FIG. 2B).

The ball bearings 6 and the rollers 7 may be of a light construction since they only support very small vertical forces as a result of the equilibrium between the weight of annular element 1 and the buoyancy of water applied to this element.

Two propulsion units or propellers H1 and H2 are secured to the annular element 1 in a first diametral plane thereof with symmetrical locations with respect to the vertical axis ZZ′ and have thrust axes whose orientations are symmetrical with respect to a second diametral plane at right angles to the first plane.

In the embodiment illustrated by FIG. 2, these two thrust axes have been chosen parallel to each other on the ground of simplicity.

It must be appreciated however that other forms of embodiments may equally been chosen, in which these thrust axes are convergent toward (or divergent from) the symmetry plane.

Furthermore it is not absolutely necessary that the points of application of the thrusts by the two propulsion units should be at a same distance from axis ZZ′, since a difference between the respective distances of these points with respect to the axis could be compensated by a suitable adjustment of the relative magnitudes of the thrusts of the propulsion units, so as to equalize their moments of rotation.

The propulsion system (H1, H2) can thus apply to the floating installation a resulting horizontal thrust whose intensity or magnitude is adjustable by varying the magnitude of the thrusts produced by the two propulsion units H1 and H2, and whose orientation may be changed at will by a rotation of the annular element 1 around the axis Z′Z.

The position in a horizontal plane of the centre of gravity of the installation N can thus be changed at will without the propulsion system (H1, H2) subjecting the installation to a rotational couple, since the annular element 1 can freely rotate in the well 2.

The action of the external forces on the whole floating installation results in a drift of its gravity center G with respect to a reference position. This drift may be symbolized by a vector $\vec{V}$ connecting the reference position to the actual position of the installation.

The system according to the invention comprises a device for detecting the amplitude and the direction of this vector, either directly, according to a preferred form of embodiment, or from the components of this vector in a system of two coordinate axis. This detection device, which is indicated by D on FIG. 5, is adapted to produce two electrical measurement voltages $\rho$ and $\alpha$, which are respectively functions of the amplitude of the vector $-\vec{V}$ and of its angle of inclination relative to a reference axis Gx of the detection device.

The sytsem according to the invention is adapted to control the application by the propulsion units H1 and H2 respective thrusts corresponding to a resultant thrust whose magnitude is proportional to $\rho$ and having substantially the same orientation as vector $-\vec{V}$.

FIGURE 3 is a diagram showing an embodiment of this device D for detecting the horizontal displacements of the center of gravity G of the installation N, comprising a resolver RL which derives the electric voltages $\rho$ and $\alpha$ from two electric signals $\Delta x$ and $\Delta y$ which are respectively functions of the components of the vector $-\vec{V}$ on two rectangular coordinate axes. These signals may for example originate from a device known as a tiltmeter or inclinometer measuring the projections on two vertical planes at right angles of the angle of inclination, with respect to the vertical, of a taut line stretched between the installation N and a fixed location on the water bottom, constituting the reference location, these signals being respectively functions of the coordinate $x$, $y$ of this fixed location in a system of two rectangular axes Gx, Gy attached to the installation N.

The signals $\Delta x$ and $\Delta y$ can be converted into the electrical voltage $\rho$ and $\alpha$ complying with the two relations $$\rho \cos \alpha = \Delta x$$
$$\rho \sin \alpha = \Delta y$$

these voltages being respectively functions of the amplitude of the vector $-\vec{V}$ and of its inclination on the axis Gx, such a conversion being realized by means of an electronic resolution unit such as the resolution unit RL shown by FIGURE 3.

In a first form of embodiment of such an electronic resolution unit, coordinate converters of known type are used, whose stator and rotor each comprise two coils having axes at right angles to each other.

The electric voltages $\Delta x = \rho \cos \alpha$ and $\Delta y = \rho \sin \alpha$ each and separately modulate a low-frequency alternating carrier current and the resulting voltages are applied respectively to the two coils of the stator (inductor) of the resolver.

The voltage induced in a first of the coils of the rotor (armature) is used to control the angular position of this rotor (after amplification it controls an electric motor driving the rotor). The rotor thus assume the position for which this voltage is zero.

In this position, the axis of the second coil of the rotor is at an angle $\alpha$ with respect to the axis of the stator to which is applied the voltage $\rho \cos \alpha$ and the tension appearing between the terminals of this second coil is proportional to $\rho$.

In a preferred form of embodiment of the resolution unit RL, sine-cosine protentiometers which may be of a conventional type used in analogue computing and operating with direct current will be imployed instead of the resolvers operating with an alternating carrier current.

The direct voltages $\rho \cos \alpha$ and $\rho \sin \alpha$ respectively will be fed into these sine-cosine potentiometers G1 and G2, in the manner indicated in FIG. 3.

A sine-cosine potentiometer which may be employed is, for example, of the type diagrammatically shown in FIG. 4 and will make it possible to obtain from optional opposed input voltages $+U$ and $-U$ the two tensions $U \cos \alpha'$ and $U \sin \alpha'$ in which $\alpha'$ is the angle of rotation of a slider.

The potentiometer shown by FIG. 4 comprises a winding 9 arranged along a half-circle whose terminals 10 and 11 are diametrically opposed and form the two input terminals of the potentiometer to which the respective voltages $+U$ and $-U$ are applied.

A first slider 12 is displaceable in contact with the winding by rotation around an axis passing through the center I of the half-circle.

The winding 9 is arranged in such a manner that the voltage tapped off the slider 12 connected to a first output 13 of the potentiometer varies accordance to $+U \cos \alpha'$ during the rotation of the slider 12 around the center I ($\alpha'$ being the angle of this slider with the diameter passing through the input terminals 10-11).

A second slider 14, insulated from the preceding one, turning around the same axis and having a constant inclination $\pi/2$ on the slider 12, makes it possible to obtain a voltage $$U \cos\left(\alpha' - \frac{\pi}{2}\right) = U \sin \alpha'$$

from the second output terminal 15 connected to the slider 14.

Reverting to the form of embodiment of the resolution unit illustrated by FIG. 3, it is apparent that the direct voltages $\Delta x = \rho \cos \alpha$ and $-\Delta x = -\rho \cos \alpha$ (this last voltage being obtained from the preceding one by the operational amplifier FA1 having the gain $-1$) are respectively applied to the two input terminals of the sine-cosine potentiometer G1.

In analogous manner, the voltages $\Delta y = \rho \sin \alpha$ and $-\rho \sin \alpha$ are applied to G2 (this last voltage being obtained from $\rho \sin \alpha$ by the operational amplifier FA2 having the gain $-1$).

The sliders of the potentiometers G1 and G2 occupy an identical angular position $\alpha'$, their rotation being controlled by one and the same electrical motor (M$ot$).

The voltages $\rho \cos \alpha \cos \alpha'$ and $\rho \cos \alpha \sin \alpha'$ are respectively collected at the two output terminals of G1 and the voltages $\rho \sin \alpha \cos \alpha'$ and $\rho \sin \alpha \sin \alpha'$ are collected at the output terminals of G2.

These different voltages are combined in such a manner in the operational amplifiers FA3 and FA4 as to obtain at the output of these amplifiers the respective voltages:

$$\rho(\cos \alpha \cos \alpha' + \sin \alpha \sin \alpha')$$

and $$\rho(\cos \alpha \sin \alpha' + \sin \alpha \cos \alpha') = \rho \sin(\alpha - \alpha')$$

After amplification, this last voltage is used for controlling the motor (M$ot$) driving in rotation the sliders of G1 and G2, which thus rotate until they occupy the position defined by $\alpha' = \alpha$, since the control voltage of the motor (M$ot$) becomes zero for this value of $\alpha'$.

When this position is reached, the voltage issuing from the amplifier FA3 is equal to $\rho(\cos^2 \alpha + \sin^2 \alpha) = \rho$.

The resolution unit thus simultaneously supplies $\rho$ (output voltage of FA3) and $\alpha$ (common orientation of the sliders of the potetiometers G1 and G2, this orientation being also obtained in the form of an electric voltage for example by connecting the driving shaft of the motor (M$ot$) to the slider of a potentiometer as indicated on FIG. 3).

The automatic dynamic positioning system according to the invention is adapted to make at every instant equal to the voltage $\alpha$, issuing from the device D and representing the direction of drift of the floating installation N, an electric voltage $\beta$ representing at the same instant the inclination of the common direction of the thrust axes of the propulsion unit H1 and H2 with respect to the reference axis Gx of the detection device D.

This equalization of the electric voltages $\alpha$ and $\beta$ will result from a rotation of the annular element 1 around the axis Z'Z, this rotation being obtained by a control system to which is applied an electric voltage proportional to the algebraic difference $\alpha - \beta$ constituting a control voltage for this system.

The reference axis Gx of the detection device D may be an axis attached to the part of the installation N surrounding the element 1.

This will be for example the case if the device D is an inclinometer having a taut line fixed to that part of the floating installation.

In such a case the control system, causing the rotation of the element 1 so as to nullify the difference $\alpha - \beta$, might comprise on the one hand an electric motor driving in rotation the annular element 1 around the axis ZZ' through a mechanical connection with that part of the installation surrounding the element 1 (for example through gear means cooperating with a toothed crown surrounding the element 1 and integral therewith, this motor being controlled by a voltage proportional to the difference $\alpha - \beta$, and on the other hand control devices for making the magnitude of the thrust exerted by the propulsion units H1 and H2 both equal to a common value proportional to $\rho/2$, $\rho$ being one of the two electrical voltages supplied by the detection device D (that voltage issuing from the amplifier FA3, in the form of embodiment illustrated by FIG. 3).

These last-mentioned devices for controlling the thrust magnitude may be realized in the same manner as the ones used in the preferred form of embodiment, whose description will be given hereinafter with reference to FIG. 6.

This preferred form of embodiment makes it possible to render the annular element 1 completely independent of the rest of the floating installation N, by causing the rotation of this element around its axis ZZ' through a differentiation of the respective intensities of the thrusts of the propulsion units H1 and H2.

It will be advantageous in this embodiment to use a detection device D, whose reference axis D is not a particular direction attached to the part of the installation N surrounding the annular element 1, but is an "absolute" or fixed direction, such as the north direction indicated by a compass or by a gyrocompass.

This form of embodiment has the advantage not to introduce into the control system the value of the heading of the installation N, this heading being subjected, as previously pointed out, to oscillatory variations, as a result of the action of the external forces acting on N. Such variations when they are applied to the control system have a detrimental influence on the stability and precision in the positioning of the center of gravity G of the floating installation.

It will be possible to use, for example, as a device D for detecting the drift of the point G a device comprising four ranging units ($h_1$, $b_1$; $h_2$, $b_2$; $h_3$, $b_3$; $h_4$, $b_4$; FIG. 1), each of which is constituted by a receiver for acoustic waves in water or hydrophone ($h_1$, $h_2$ . . .) which is fixed to the water bottom and electrically connected through an electric wire or cable to an associated surface buoy ($b_1$, $b_2$ . . .). This associated buoy will comprise an emitter for electromagnetic response-signals whose emission is controlled by the reception of an acoustic signal at the associated hydrophone, the four hydrophones being substantially located at the respective apices of a square and the hydrophones $h_1$, $h_3$ being positive along a direction at a known angle with respect to the south-north direction.

This detection device will comprise emitter of acoustic signals in the water which will be located in the immediate vicinity of the axis Z'Z and a receiver of the electromagnetic response signals located on the floating installation. By determining, for example, in the form of electric voltages, the two differences:

$$\Delta Tx = t_1 - t_3$$
$$\Delta Ty = t_2 - t_4$$

from the respective instant of reception $t_1$, $t_2$, $t_3$, $t_4$ of the electromagnetic pulses emanating from the four ranging units, in response to the emission from the installation N of one and the same acoustic signal, this device can be adapted to provide two electrical voltages:

$$X = \frac{c}{2}\sqrt{\frac{h^2}{a^2}+1}\,\Delta Tx$$
$$Y = \frac{c}{2}\sqrt{\frac{h^2}{b^2}+1}\,\Delta Ty$$

which are related to the coordinates of the point G in the system of the median planes, or planes of symmetry of the segments $h_1h_3$ and $h_2h_4$, if the difference of distances $Gh_1-Gh_3$ is much smaller than the distances $h_1h_3$ and if the difference $Gh_2-Gh_4$ is much smaller than $h_2h_4$ and if these coordinates of G remain smaller than limiting values, themselves small compared to $h$.

In the above formula, $h$ is the depth of water, $c$ the speed of propagation in water of the acoustic waves in water and $a = h_1h_3/2$, $b = h_2h_4/2 \neq a$.

Such a detection device will provide two electrical voltages related to the instantaneous position of the point G in a reference system having two rectangular coordinate axes, one of these axes being directed along the south-north direction and constituting the reference axis $Gx$ of this detection device.

These electrical voltage $\Delta x$ and $\Delta y$ will constitute the electrical voltages introduced into an electronic resolution unit such as the unit RL shown by FIG. 3, which provides two electrical voltages $\rho$ and $\alpha$, the latter being a function of the inclination with respect to the south-north direction of the direction of drift of the point G from a reference position substantially in plumb with the center of the square $h_1h_2h_3h_4$.

In this preferred form of embodiment a rotation sensing device such as a gyrocompass $Gyr$ (FIG. 2), located on the annular element 1 and thus driven in rotation by this element around the axis $ZZ'$, provides the electric voltage $\beta$ function of the inclination at a given instant of the symmetry plane of the propulsion units $h_1$ and $h_2$ with respect to the north direction.

A differential amplifier $d$ (FIG. 5), at the input terminals of which are respectively applied the voltage $\alpha$ issuing from the detection device D and the voltage $\beta$, generates the control signal $K(\alpha-\beta)$, K being the gain of this amplifier.

Operational amplifiers FA5 and FA6 are connected to the output terminals of the differential amplifier $d$ and of the detection device D in the manner indicated by FIG. 5, so as to respectively deliver the output tensions $$\rho_1 = \frac{\rho}{2} - \frac{K(\alpha-\beta)}{2}$$

and $$\rho_2 = \frac{\rho}{2} + \frac{K(\alpha-\beta)}{2}$$

These tensions are respectively applied to devices for controlling the magnitude of the thrust developed by the propulsion unit $H_1$ proportionally to $\rho_1$ and for controlling the magnitude of the thrust developed by the propulsion unit $H_2$ proportionally to $\rho_2$, the thrusts exerted by these propulsion units having the same orientation.

As long as the voltage $\beta$ does not become equal to the voltage $\alpha$ delivered by D, the magnitudes $\rho_1$ and $\rho_2$ of the thrusts respectively exerted by the propulsion units are not equal and the annular element 1 rotates around its axis $Z'Z$, without however transmitting any moment of rotation to the rest of the installation.

The rotation is stopped when $\beta = \alpha$ and then $\rho_1 = \rho_2 = \rho/2$, which corresponds to a direction and a magnitude of the resulting thrust in conformity with the orders delivered by the detection device D.

FIG. 6 shows diagrammatically a type of control device which can be used for controlling the magnitude of the thrust developed by a propulsion unit as a function of any value $\rho_1$, assuming for example that the motor driving the propulsion unit is a Diesel engine.

In order to obtain a given thrust of a propulsion unit comprising a screw or propeller, it is necessary to control its speed of rotation which is proportional to the square root of the thrust.

The problem thus resides in realizing circuits for controlling the speed of rotation of the screw as a function of a given value $\rho_1$ of the thrust to be exerted.

This control may be achieved in simple manner if parabolic potentiometers (potentiometers of the "squaring" type, or "square root potentiometers," are available.

In a control circuit such as the one shown by FIG. 6, the electrical voltage $\rho_1$ enters the square root potentiometer $R_c$ which supplies the voltage $\sqrt{\rho_1}$.

This latter is applied to the differential amplifier $A_d$ which amplifies the difference between this voltage $\sqrt{\rho_1}$, and a feedback voltage proportional to the speed of rotation of the Diesel engine $m_1$ driving the propulsion unit $H_1$.

The signal issuing from $A_d$ traverses the direct current amplifier AC whose output voltage controls the rotation of an electrical motor $m$.

In its turn, this rotation controls the operation of the injection pump of the Diesel engine $m_1$ by an assembly comprising the gearwheel 16, the toothed sector 17 pivotally mounted at 18 on a spindle parallel to the axis of rotation of the motor $m$ and carried by a frame 19 of the same, and the linkage system 20.

The speed of rotation of the propulsion unit $H_1$ may be made proportional to the angle through which the toothed sector 17 is turned.

This angle may be detected by the slide 21 integral with the sector 17 and displaced on the linear potentiometer PL, between whose extremities a potential different E is applied.

The slider 21 thus makes it possible to tap a voltage proportional to the angle through which the sector 17 turns, thus proportional to the speed of rotation of the propulsion unit $H_1$.

This voltage represents the feedback signal applied to the differential amplifier $A_d$ by means of the conductor 22.

It must be appreciated that a floating installation provided with an automatic dynamic positioning system according to the invention may also comprise known means, completely separated from this system, for separate adjustment of the heading of this installation, such adjustment means being either manually controlled or completely automatic.

The vessel N may for instance, according to the aforementioned British Patent No. 1,014,879, comprise a bow propulsion unit whose thrust is adjustable and can be reversed, this propulsion unit being located in a transverse tunnel 23 (FIG. 1), preferably cooperating with a stern propulsion unit equally capable of exerting a transverse thrust on the vessel N, so as to apply thereto a pure moment of rotation, without any residual transverse force, which would cause a transverse displacement of the center of gravity G of the installation.

Such additional propulsion units may be automatically controlled by an electrical voltage function of the angular deviation between the heading selected for the vessel and the actual heading which may be measured by any appropriate device, such as a gyrocompass.

What is claimed is:

1. In an automatic dynamic positioning system for substantially maintaining a floating installation in a reference position, comprising a central element having a vertical axis freely rotatable with respect to the remainder of the installation, the improvement comprising a plurality of propulsion units fixed to said element substantially in a first diametral plane thereof and having thrust axes whose respective orientation are substantially symmetrical with respect to a second diametral plane at right angles to said first plane, a first detection device detecting the amplitude ($p$) and direction ($\alpha$) of the drift of the installation from said reference position, a second detection device detecting the direction ($\beta$) of said second diametral plane, and means connected to said first and second detection devices to rotate said element through an angle which is a function of $\alpha-\beta$ and to modulate the thrust of said propulsion units as a function of the amplitude of said drift.

2. The system in accordance with claim 1, wherein the means to rotate said element comprises a device for driving said propulsion units to produce a differential thrust therebetween, the differential thrust being a function of $\alpha-\beta$.

3. Automatic dynamic positioning system for substantially maintaining in a reference position a floating installation of the type comprising a central annular element having a vertical axis and freely rotatable with respect to the remainder of the installation, comprising drift measuring means for measuring the drift of the floating installation from the reference position and the direction of said drift, said drift measuring means generating a first and a second signal which are respectively functions of the amplitude of siad drift and of the direction thereof, two propulsion units fixed to said annular element substantially in a first diametral plane thereof and having thrust axes whose respective orientations are substantially symmetrical with respect to a second diametral plane at right angles to said first plane, means for measuring the orientation of said second diametral plane, said orientation measuring means generating a third signal which is a function of said orientation of said second diametral plane, orientation controlling means connected to said drift measuring means and to said orientation measuring means, supplying an orientation controlling signal which is a function of the difference between said first and said third signal and means for controlling the sum of the thrusts of said propulsion units by said first signal and for controlling the rotation of said central annular element around its axis by said orientation controlling signal.

4. Automatic dynamic positioning system according to claim 3, wherein said drift measuring means measures the direction of the drift of said installation with respect to a reference axis whose direction is independent of the variations in heading of the part of said installation surrounding said central annular element, comprising two operational amplifiers to which are applied said first signal and said orientation controlling signal, said two operational amplifiers generating a fourth and a fifth electrical signal whose sum is substantially proportional to said first signal and whose difference is substantially proportional to said orientation controlling signal and two actuating means controlling the magnitude of the thrust exerted by the two propulsion units respectively by the respective values of said fourth and said fifth electrical signal.

References Cited

UNITED STATES PATENTS

| | | | |
|---|---|---|---|
| 3,105,453 | 10/1963 | Hayes | 114—144 |
| 3,145,683 | 8/1964 | Kolb et al. | |
| 3,148,653 | 9/1964 | Shatto et al. | 235—150.27 X |
| 3,167,049 | 1/1965 | Foster. | |
| 3,176,645 | 4/1965 | Shatto | 114—144 |
| 3,280,311 | 10/1966 | Shatto et al. | 235—150.27 |

MALCOLM A. MORRISON, Primary Examiner

JOSEPH F. RUGGIERO, Assistant Examiner

U.S. Cl. X.R.

235—189

UNITED STATES PATENT OFFICE
CERTIFICATE OF CORRECTION

Patent No. 3,500,025          Dated March 10, 1970

Inventor(s) PIERRE AUBEL et al

It is certified that error appears in the above-identified patent and that said Letters Patent are hereby corrected as shown below:

Column 2, Line 62, change "2-2" to ---a-a---

Column 6, Line 69, change "positive" to ---positioned---

Column 7, Line 57, change "tensions" to ---voltages---

Column 7, Line 66, change "tensions" to ---voltages---

SIGNED AND SEALED
OCT 20 1970

(SEAL)
Attest:

Edward M. Fletcher, Jr.
Attesting Officer

WILLIAM E. SCHUYLER, JR.
Commissioner of Patents